(12) United States Patent
Miyasaka

(10) Patent No.: US 7,835,553 B2
(45) Date of Patent: Nov. 16, 2010

(54) IDENTITY AUTHENTICATION DEVICE AND FINGERPRINT SENSOR

(75) Inventor: Mitsutoshi Miyasaka, Nagano (JP)

(73) Assignee: Seiko Epson Corporation (JP)

( * ) Notice: Subject to any disclaimer, the term of this patent is extended or adjusted under 35 U.S.C. 154(b) by 954 days.

(21) Appl. No.: 11/207,757

(22) Filed: Aug. 22, 2005

(65) Prior Publication Data
US 2006/0067564 A1  Mar. 30, 2006

(30) Foreign Application Priority Data
Sep. 30, 2004  (JP)  ............................. 2004-288494

(51) Int. Cl.
*G06K 9/00*  (2006.01)
(52) U.S. Cl. ..................... 382/124; 382/115
(58) Field of Classification Search ................ 382/124; 73/862.046; 324/661, 662
See application file for complete search history.

(56) References Cited

U.S. PATENT DOCUMENTS

| | | | | |
|---|---|---|---|---|
| 4,353,056 A | * | 10/1982 | Tsikos | 382/124 |
| 4,394,773 A | * | 7/1983 | Ruell | 382/124 |
| 4,429,413 A | * | 1/1984 | Edwards | 382/124 |
| 4,577,345 A | * | 3/1986 | Abramov | 382/124 |
| 5,325,442 A | * | 6/1994 | Knapp | 382/124 |
| 6,055,324 A | * | 4/2000 | Fujieda | 382/124 |
| 6,061,464 A | * | 5/2000 | Leger | 382/124 |
| 6,282,303 B1 | * | 8/2001 | Brownlee | 382/124 |
| 6,370,965 B1 | | 4/2002 | Knapp | |
| 6,392,636 B1 | * | 5/2002 | Ferrari et al. | 345/173 |
| 6,523,745 B1 | * | 2/2003 | Tamori | 235/382 |
| 7,010,145 B1 | * | 3/2006 | Haruki et al. | 382/115 |
| 7,091,726 B2 | * | 8/2006 | Sano et al. | 324/661 |
| 7,116,116 B2 | * | 10/2006 | Ebihara et al. | 324/662 |
| 7,164,384 B2 | * | 1/2007 | Howard | 342/357.07 |
| 7,239,227 B1 | * | 7/2007 | Gupta et al. | 340/5.82 |
| 7,330,572 B2 | * | 2/2008 | Uchida | 382/124 |
| 7,715,601 B2 | * | 5/2010 | Sheu et al. | 382/124 |
| 2003/0072475 A1 | * | 4/2003 | Tamori | 382/124 |
| 2004/0099065 A1 | * | 5/2004 | Deconde et al. | 73/862.046 |
| 2004/0252867 A1 | * | 12/2004 | Lan et al. | 382/124 |
| 2005/0078856 A1 | * | 4/2005 | Miyasaka et al. | 382/124 |
| 2005/0259850 A1 | * | 11/2005 | Shimamura et al. | 382/124 |
| 2006/0034499 A1 | * | 2/2006 | Shinoda et al. | 382/124 |

FOREIGN PATENT DOCUMENTS

| | | |
|---|---|---|
| JP | 10-247906 | 9/1998 |
| JP | 11-118415 | 4/1999 |
| JP | 2001-56204 | 2/2001 |
| JP | 2001-084062 | 3/2001 |
| JP | 2001-133213 | 5/2001 |

OTHER PUBLICATIONS

Patent Abstracts of Japan, Publication No. 2001-133213, Publication Date May 18, 2001, 2 pages.
Patent Abstracts of Japan, Publication No. 2001-056204, Publication Date Feb. 27, 2001, 1 pages.

* cited by examiner

*Primary Examiner*—Daniel G Mariam
*Assistant Examiner*—Aklilu k Woldemariam
(74) *Attorney, Agent, or Firm*—Harness, Dickey & Pierce, P.L.C.

(57) ABSTRACT

An identity authentication device including a case member, a fingerprint sensor member being detachable from the case member, a first metal terminal formed in the finger print sensor member and a second metal terminal formed in the case member and electrically connectable with the first metal terminal.

15 Claims, 8 Drawing Sheets

CASE1: CONNECTING TERMINALS
    POWER SUPPLY  Vdd (POSITIVE VOLTAGE)  Vss (NEGATIVE VOLTAGE)    2
    OUTPUT    DOUT(Data-Out)    1
    INPUT     RESET-X (OPERATION INSTRUCTION)    17
               CLOCK-X (COLUMN SIDE CLOCK)
               SPX(X-START PULSE)
               CLOCK-Y (ROW SIDE CLOCK)
               SPY(Y-START PULSE)
               VREF1-8 (COMPARISON POTENTIAL FOR AMPLIFIER CIRCUIT)
               EPX (X-END PULSE)
               EPY (Y-END PULSE)
               RESET-Y (OPERATION INSTRUCTION)
               ENABLE (EXTRACTION INSTRUCTION)
                                         TOTAL: 20 TERMINALS CASE2: CONNECTING TERMINALS
    POWER SUPPLY  Vdd (POSITIVE VOLTAGE)  Vss (NEGATIVE VOLTAGE)    2
    OUTPUT    DOUT(Data-Out)    1
    INPUT     RESET (OPERATION INSTRUCTION)    7
               CLOCK-X (COLUMN SIDE CLOCK)
               SPX(X-START PULSE)
               CLOCK-Y (ROW SIDE CLOCK)
               SPY(Y-START PULSE)
               ENABLE (EXTRACTION INSTRUCTION)
               VREF (COMPARISON POTENTIAL FOR AMPLIFIER CIRCUIT)
                                         TOTAL: 10 TERMINALS CASE3: CONNECTING TERMINALS
    POWER SUPPLY  Vdd (POSITIVE VOLTAGE)  Vss (NEGATIVE VOLTAGE)    2
    OUTPUT    DOUT(Data-Out)    1
    INPUT     RESET (OPERATION INSTRUCTION)    4
               CLOCK (COLUMN SIDE CLOCK)
               ENABLE (EXTRACTION INSTRUCTION)
               VREF (COMPARISON POTENTIAL FOR AMPLIFIER CIRCUIT)
                                       TOTAL: 7 TERMINALS CASE4: CONNECTING TERMINALS
    POWER SUPPLY  Vdd (POSITIVE VOLTAGE)  Vss (NEGATIVE VOLTAGE)    2
    OUTPUT    DOUT(Data-Out)    1
    INPUT     RESET (OPERATION INSTRUCTION)    2
               CLOCK (BASIC CLOCK)
                                       TOTAL: 5 TERMINALS CASE5 (MINIMUM CONFIGURATION): CONNECTING TERMINALS
    POWER SUPPLY  Vdd (POSITIVE VOLTAGE) Vss (NEGATIVE VOLTAGE)    2
    OUTPUT    DOUT(Data-Out)    1
    INPUT     RESET (OPERATION INSTRUCTION)    1
                                       TOTAL: 4 TERMINALS

FIG. 8

IDENTITY AUTHENTICATION DEVICE AND FINGERPRINT SENSOR

RELATED APPLICATION INFORMATION

The present application claims priority to Japanese Application No. 2004-288494, filed Sep. 30, 2004, whose contents are expressly incorporated herein by reference.

BACKGROUND OF THE INVENTION

1. Technical Field

The present invention relates to an identity authentication device and a fingerprint sensor.

2. Related Art

An identity authentication device equipped with a fingerprint sensor has been known. As common sensing measures in such fingerprint sensor, there are a resistance detecting type, a photoelectric type, a piezoelectric type and a capacitance type.

The capacitance type fingerprint sensor detects a fingerprint pattern by determining capacitance which varies due to a distance between the fingerprint having concavity and convexity and a detection surface. The capacitance type fingerprint sensor can be easily contained in a thin and small package since it does not require a light source. Japanese Unexamined Patent Publication No. 2001-56204 is a first example of related art and Japanese Unexamined Patent Publication No. 2001-133213 is a second example of related art. Such capacitance type fingerprint sensor is disclosed in, for example, the first and second examples.

Generally, a dielectric thin film having a thickness of about 200-500 mm is formed on the detection surface to which the fingerprint contacts in the capacitance type fingerprint sensor. The dielectric thin film tends to be easily broken away or damaged by friction or degradation since the dielectric thin film is a place where the finger print contacts with. Therefore, there is a problem of a low durability of the dielectric thin film.

SUMMARY

An advantage of the present invention is to provide an identity authentication device in which the fingerprint sensor is easily and inexpensively replaceable even when the fingerprint sensor is broken and to provide the fingerprint sensor which is easily replaceable in the identity authentication device.

According to a first aspect of the invention, an identity authentication device includes a case member, a fingerprint sensor member being detachable from the case member, a first metal terminal formed in the finger print sensor member and a second metal terminal formed in the case member and electrically connectable with the first metal terminal.

Here, though a dielectric thin film in the fingerprint sensor member tends to be easily broken away or damaged by friction or degradation, according to the first aspect of the invention, the identity authentication device in which only the fingerprint sensor is easily replaceable can be realized since the fingerprint sensor is made to be detachable from the case member. In other words, even when the fingerprint sensor member is broken away or damaged, the case member still can be used and only the fingerprint sensor member where the damage is caused can be changed. Moreover, the metal terminals are provided in the fingerprint sensor member and the case member so that the fingerprint sensor member and the case member are electrically coupled each other through the metal terminals. Therefore, when the fingerprint sensor member is fitted in the case member, the fingerprint information obtained by the fingerprint sensor member can be electrically transmitted to the case member.

It is preferable that the fingerprint sensor member includes a matrix of detection part detecting fingerprint information as capacitance, a driving circuit part obtaining the fingerprint information and an amplifier circuit part amplifying a voltage signal of the fingerprint information.

Since the fingerprint sensor member has the detection part, the driving circuit part and the amplifier circuit part, the detection part can detect the fingerprint information as the capacitance, the driver circuit part can obtain the fingerprint information and the amplifier circuit part can amplify the voltage signal of the fingerprint information.

Moreover, it is not necessary to form these circuit parts in the case member since these circuit parts are provided in the fingerprint sensor member. For example, if the driver circuit parts and the amplifier circuit part are not provided in the fingerprint sensor member, about 500 output terminals each in the row side and the column side so that about 1000 output terminals in total have to be provided in the fingerprint sensor member. However, according to the first aspect of the invention, it is not necessary to have such a large number of terminals because the driver circuit part and the amplifier circuit part are provided in the fingerprint sensor member. If about a thousand of the metal terminals are provided in the fingerprint sensor member, another thousand of the metal terminals have to be provided in the case member. In this case, a pitch between each two metal terminals becomes very small and a contact area per metal terminal becomes smaller so that reliability of the electrical connection will be degraded.

Instead, the fingerprint sensor member has the detection part, the driver circuit part and the amplifier circuit part according to the first aspect of the invention so that the number of the metal terminals which are coupled to the metal terminals in the case member can be largely reduced. Therefore, it is possible to provide these circuits in the fingerprint sensor member itself and the reliability of the electrical connection with the metal terminals of the case member can be secured. In addition, the number of the metal terminals is largely reduced compared to the case when the large number of the metal terminals is provided as described the above. Therefore, the areas of the metal terminals can be expanded. Accordingly, the electric connection between the metal terminal of the fingerprint sensor member and the metal terminal of the case member can be assured and the electric connection can be easily realized.

Furthermore, when the above-mentioned driver circuit part the amplifier circuit part are provided in the case member, a voltage drop in the signal voltage could occur because of the wiring resistance of the metal wiring between the case member and the fingerprint sensor member. As a result, sensitivity of the fingerprint information signal which is inputted to the driver circuit part could be deteriorated. However, the driver circuit part and the amplifier circuit part are provided in the fingerprint sensor member according to the first aspect of the invention so that the signal voltage inputted from the driver circuit part is amplified by the amplifier circuit part in the fingerprint sensor member. Therefore, the voltage drop cased by the wiring resistance can be prevented and highly sensitive fingerprint information can be transmitted to the case member.

It is also preferable that a power supply, a CPU, a memory, an interface and the like are provided in the case member. If the power supply, the CPU, the memory, the interface and the like are provided in the fingerprint sensor member, the structure of the fingerprint sensor member will become more complicated and more manufacturing processes are required to form the fingerprint sensor member. Accordingly, a manufacturing cost per finger print sensor will rise. On the contrary, according to the first aspect of the invention, the fingerprint sensor member can be inexpensively manufactured because an authentication circuit, an image processing circuit and the like are provided in the case member rather than in the fingerprint sensor member. Furthermore, even when the fingerprint sensor member is damaged and replaced by the new one, it is possible to make its replacement cost minimum.

Furthermore, it is also preferable that the case member has a concave portion in which the fingerprint sensor member is fitted and the first metal terminal of the fingerprint sensor member is electrically coupled to the second metal terminal of the case member.

Since the fingerprint sensor member is fitted in the concave portion of the case member, it is possible to conduct alignment between the case member and the fingerprint sensor member and a precise positioning is possible. In addition, the metal terminal of the case member is coupled to the metal terminal of the fingerprint sensor member without any displacement so that its electric connection can be assuredly obtained.

According to a second aspect of the invention, a fingerprint sensor is detachable from a case member of an identity authentication device and having a first metal terminal that is electrically connectable with a second metal terminal formed in the case member.

Here, a dielectric thin film in the fingerprint sensor tends to be easily broken away or damaged by friction or degradation. However, according to the second aspect of the invention, the fingerprint sensor can be easily replaced since the fingerprint sensor is made to be detachable from the case member. In other words, even when the fingerprint sensor member is broken away or damaged, the case member still can be used and only the fingerprint sensor member where the damage is caused can be changed. Moreover, the metal terminals are provided in the fingerprint sensor member and the case member so that the fingerprint sensor member and the case member are electrically coupled each other through the metal terminals. Therefore, when the fingerprint sensor member is fitted in the case member, the fingerprint information obtained by the fingerprint sensor member can be electrically transmitted to the case member. In addition, the fingerprint sensor can be inexpensively manufactured so that the fingerprint sensor can be widely disseminated.

BRIEF DESCRIPTION OF THE DRAWINGS

The invention will be described with reference to the accompanying drawings, wherein like numbers refer to like elements, and wherein:

FIG. 8 is a drawing for explaining a connecting terminal according to the invention.

DESCRIPTION OF THE EMBODIMENTS (Identity Authentication Device)

Figure 1A:
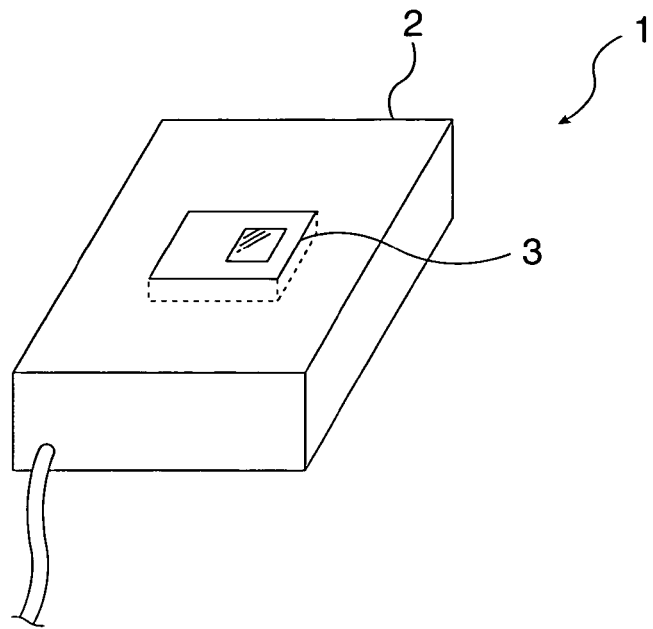
FIGS. 1A and 1B are perspective views of an identity authentication device according to a first embodiment.
Figure 1B:
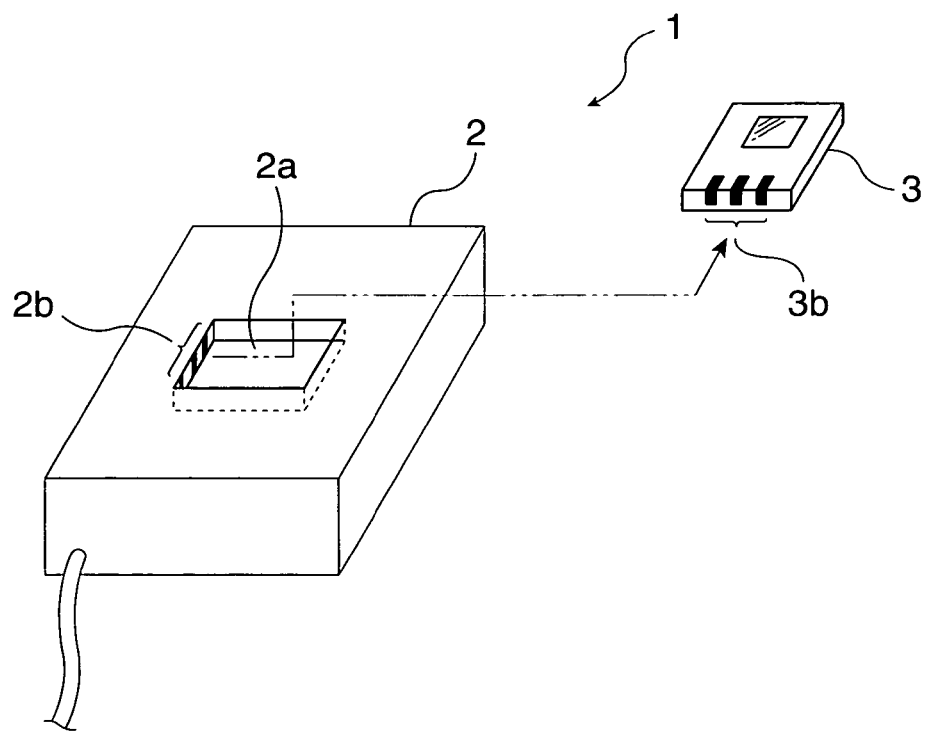

FIGS. 1A and 1B are perspective views of an identity authentication device according to this embodiment. FIG. 1A shows the identity authentication device in which a fingerprint sensor member is fitted into a case member. FIG. 1B shows the identity authentication device in which the fingerprint sensor member is detached from the case member.

As shown in FIGS. 1A and 1B, an identity authentication device 1 has a case member 2 and a fingerprint sensor member 3. Here, the fingerprint sensor member 3 is detachable from the case member 2. When the fingerprint sensor member 3 is attached in the case member 2, the fingerprint sensor member 3 is fitted in a concave portion 2a which is provided in the case member 2. In this way, the fingerprint sensor member 3 is made to be detachable from the case member 2 and it is possible to replace the fingerprint sensor member 3 alone.

The case member 2 has a metal terminal 2b and the fingerprint sensor member 3 has a metal terminal 3b. These metal terminals are capable of electrically coupling each other. When the fingerprint sensor member 3 is fitted in the concave portion 2a, the metal terminal 2b contacts and is electrically coupled with the metal terminal 3b. This enables the identity authentication device 1 to operate.

Each of these metal terminals 2b and 3b includes the same number of terminals, which is from four to twenty as described below. (Case)

Next, a structure of the case member 2 is described with reference to FIG. 2.

Figure 2:
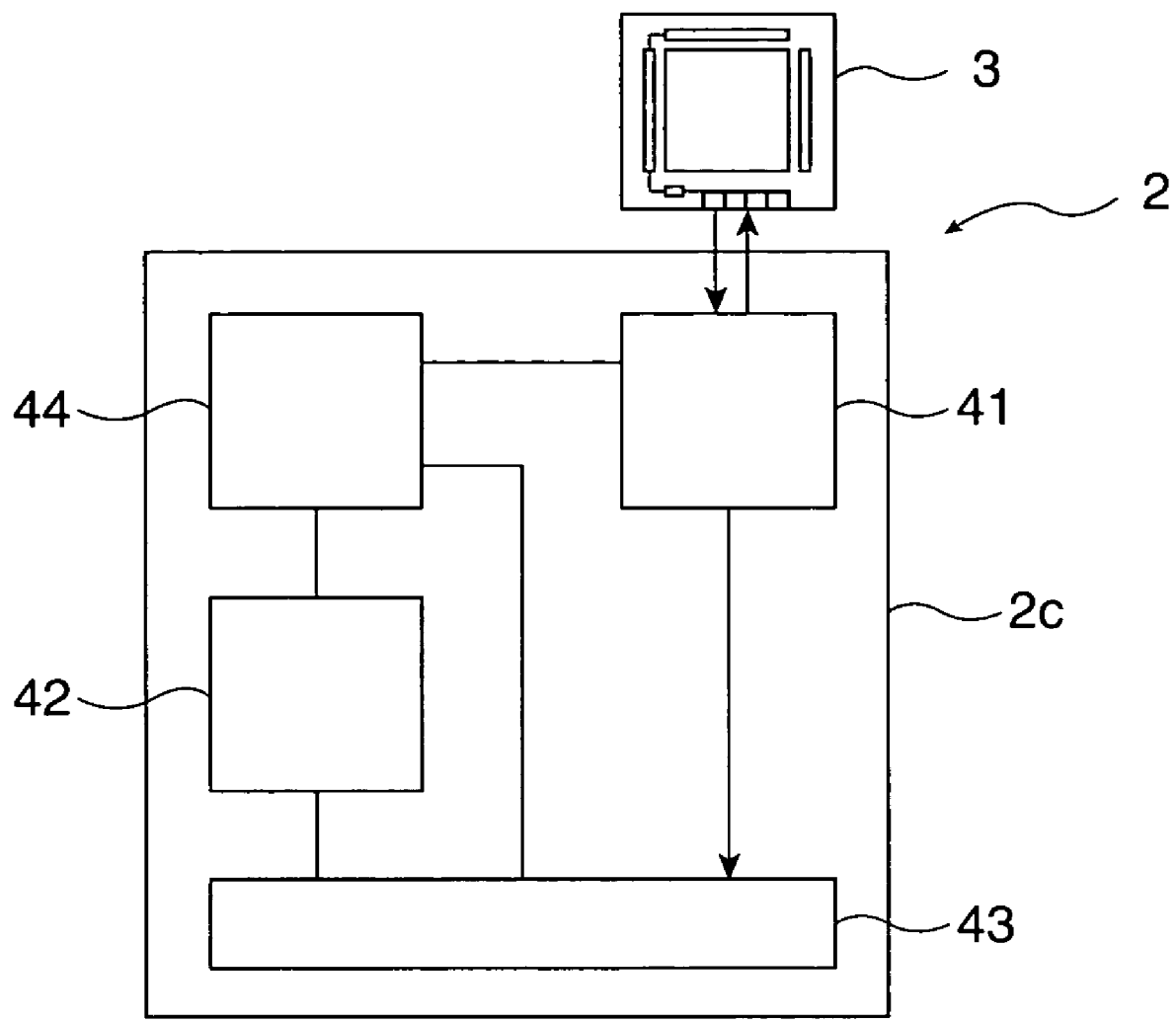
FIG. 2 is a block diagram showing a structure of a case for the identity authentication device according to the first embodiment.

FIG. 2 is a block diagram showing the structure of the case member.

A power supply, a central processing unit (CPU), a memory and an interface (I/F) are provided in the case member 2 and these components process fingerprint information that is obtained at the fingerprint sensor member 3 which will be described below. Referring FIG. 2, for example, a processing part 2c which processes an output of the fingerprint sensor member 3 is provided inside the case member 2. The processing part 2c includes a data processing part 41, a memory 42, a comparator 43 and a control part 44. The data processing part 41 extracts characteristics of a fingerprint pattern by conducting input and output to/from the fingerprint sensor member 3. The memory 42 stores various kinds of information such as the amount of the characteristics of a specific fingerprint which is set in advance. The comparator 43 compares the amount of the characteristics which are extracted by the data processing part 41 with the amount of the characteristics which are stored in the memory 42. The control part 44 controls operations of the data processing part 41, the memory 42 and the comparator 43.

In the above-described case member 2, an input signal is sent to the fingerprint sensor member 3 from the data processing part 41 and an output signal from the fingerprint sensor member 3 is received. Subsequently, in the comparator 43, the fingerprint pattern inputted to the fingerprint sensor member 3 is compared with the specific fingerprint pattern stored in the memory 42. The control part 44 outputs a result of the comparison to an unshown output, a host personal computer (PC) and the like. If a display device is coupled to the case member 2, the result will be displayed on the display device. When the fingerprints are determined to be identical, the fingerprint inputted into the fingerprint sensor member 3 becomes effective. On the contrary, when the fingerprints are determined to be not identical, the fingerprint inputted into the fingerprint sensor member 3 becomes invalid. In this way, the identity authentication is carried out in the processing part 2c.

In the above-described identity authentication device 1, the fingerprint sensor member 3 dose not carry out the fingerprint authentication but the input of the fingerprint information is conducted mainly in the fingerprint sensor member 3. The fingerprint authentication is carried out in the case member 2 by comparing the fingerprint information inputted from the fingerprint sensor member 3 with the specific information which is stored in advance.

Such identity authentication device 1 is used in order to authenticate a user by using the user's fingerprint and it is installed in things which require high security and limiting the user. Such things will be, for example, computers, electronic locking, cars and the like.

First Embodiment of the Fingerprint Sensor Member

Next, a structure of the fingerprint sensor member 3 according to a first embodiment will be described with reference to FIG. 3 and FIG. 4.

Figure 3A:
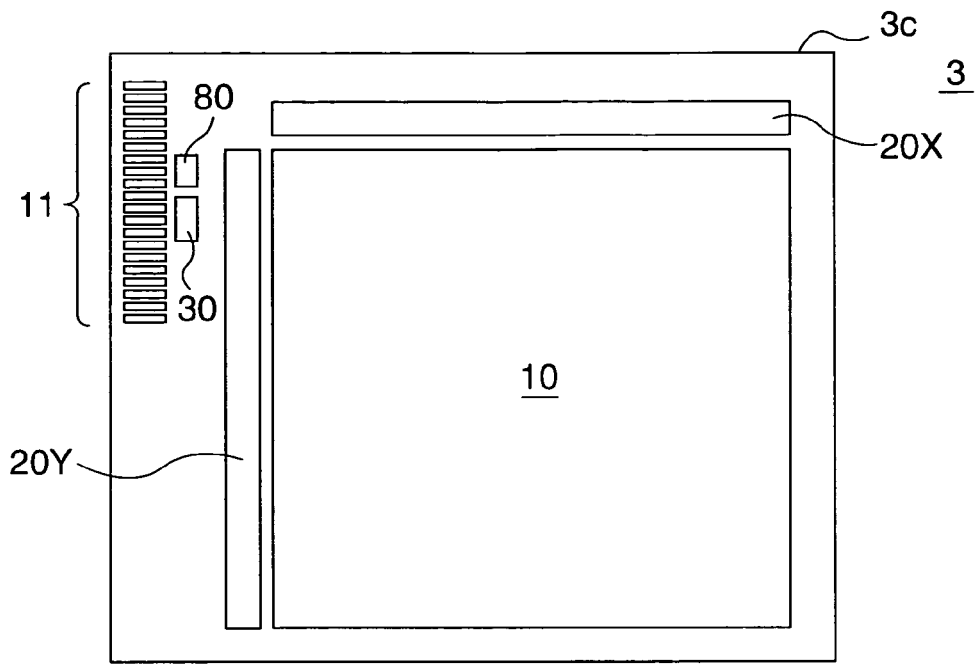
FIGS. 3A and 3B show a circuit configuration of a sensor substrate of the identity authentication device according to the first embodiment.
Figure 3B:
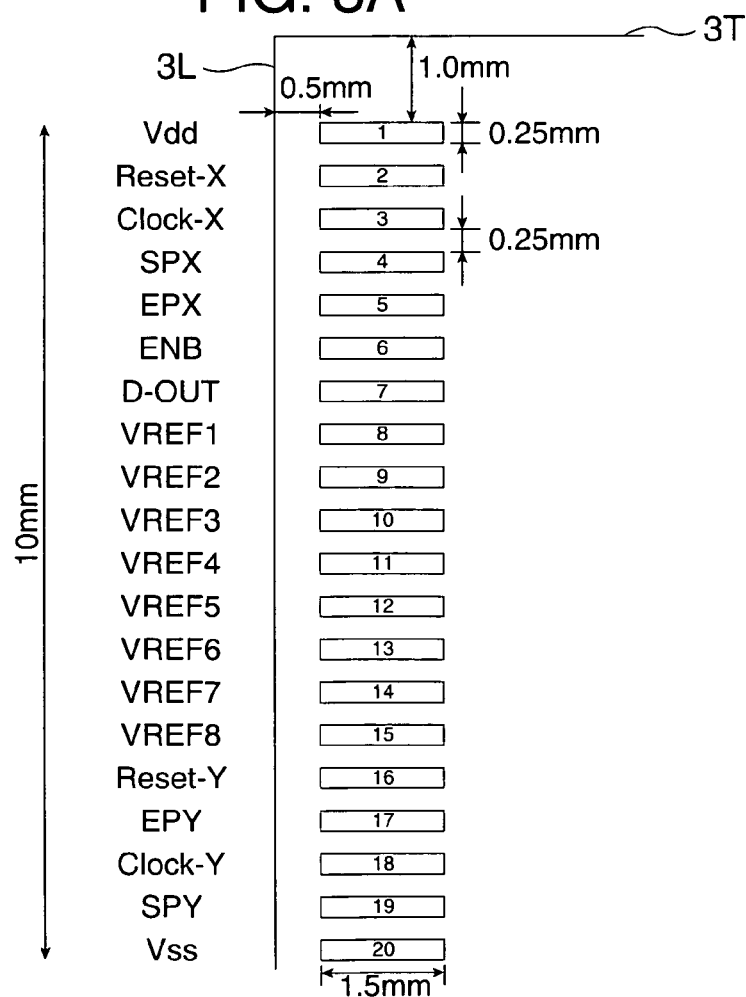

FIGS. 3A and 3B show a circuit configuration of a sensor substrate. FIG. 3A is an outline view of the sensor substrate and FIG. 3B is an enlarged view of a terminal part of the sensor substrate. FIG. 4 is a sectional view of a fingerprint sensor matrix part.

The fingerprint sensor member 3 is composed of a main body 3a, the metal terminal 3b, a sensor substrate 3c and a resin member 3d, which are described below.

In this embodiment, a fingerprint sensor matrix part 10, a connecting terminal 11, driver circuit parts 20X and 20Y (driving circuit parts), an amplifier circuit part 30 and a digital/analog (D/A) conversion part 80 are provided on the sensor substrate 3c as shown in FIG. 3.

Here, the driver circuit parts 20X and 20Y are a column circuit 20X and a row circuit 20Y. An active matrix array 113 is coupled to the column circuit 20X and the row circuit 20Y, and a plurality of scan lines or a plurality of signal lines 116 in the fingerprint sensor matrix part 10 (a detection part) is coupled to the either the column circuit 20X or the row circuit 20Y. The column circuit 20X and the row circuit 20Y drive the active matrix array 113 and receive the fingerprint information of a finger F as an electric signal.

Moreover, an unshown wiring pattern is formed on the above-described sensor substrate 3c. The wiring pattern couples the fingerprint sensor matrix part 10, the connecting terminal 11, the driver circuit parts 20X and 20Y, the amplifier circuit part 30 and the D/A conversion part 80.

Here, the sensor substrate 3c is a glass substrate. The fingerprint sensor matrix part 10, the connecting terminal 11, the driver circuit parts 20X and 20Y, the amplifier circuit part 30, the D/A conversion part 80 and the wiring pattern are formed on the sensor substrate 3c by a commonly used semiconductor manufacturing method such as photolithography.

In this embodiment, the connecting terminal 11 is provided in the plural number and twenty of them are provided here on the sensor substrate 3c. The twenty of the connecting terminals 11 are power supply terminals Vdd and Vss, an input terminal Reset-X (instruction for column side operation), an input terminal Reset-Y (instruction for row side operation), an input terminal Clock-X (column side clock), an input terminal SPX (X-Start Pulse), an input terminal Clock-Y (row side clock), an input terminal SPY (Y-Start Pulse), input terminals VREF1-VREF8 (comparison potential for the amplifier circuit), an input terminal EPX (X-End Pulse), an input terminal EPY (Y-End Pulse), an input terminal ENB (Enable, extraction instruction) and an output terminal D-OUT.

Digital signals are inputted into the input terminals VREF1-VREF8 and then converted into analog signals in the D/A conversion part 80 so as to become comparison voltages for amplifier circuit part 30.

The each of the above-mentioned twenty terminals is made to be 0.25 mm wide and 1.5 mm long. A first terminal (the power supply terminal Vdd) which is placed at the uppermost side of the twenty terminals is located on a position where is 1.0 mm from an upper part 3T of the sensor substrate 3c and 0.5 mm from a left part 3L of the sensor substrate 3c. A terminal pitch of the connecting terminals 11 is 0.25 mm and these twenty connecting terminals 11 fall within a length of 10 mm.

In the sensor substrate 3c having such input/output terminals, the driver circuit parts 20X and 20Y start their operation according to a start pulse. Furthermore, a shift register operates according to a clock signal and transistors in the fingerprint sensor matrix part 10 are sequentially moved by this in order to obtain the fingerprint information. In this way, the driver circuit parts 20X and 20Y can be steadily driven.

Next, the fingerprint sensor matrix part 10 and a detection means for the fingerprint information will be described in detail.

Figure 4:
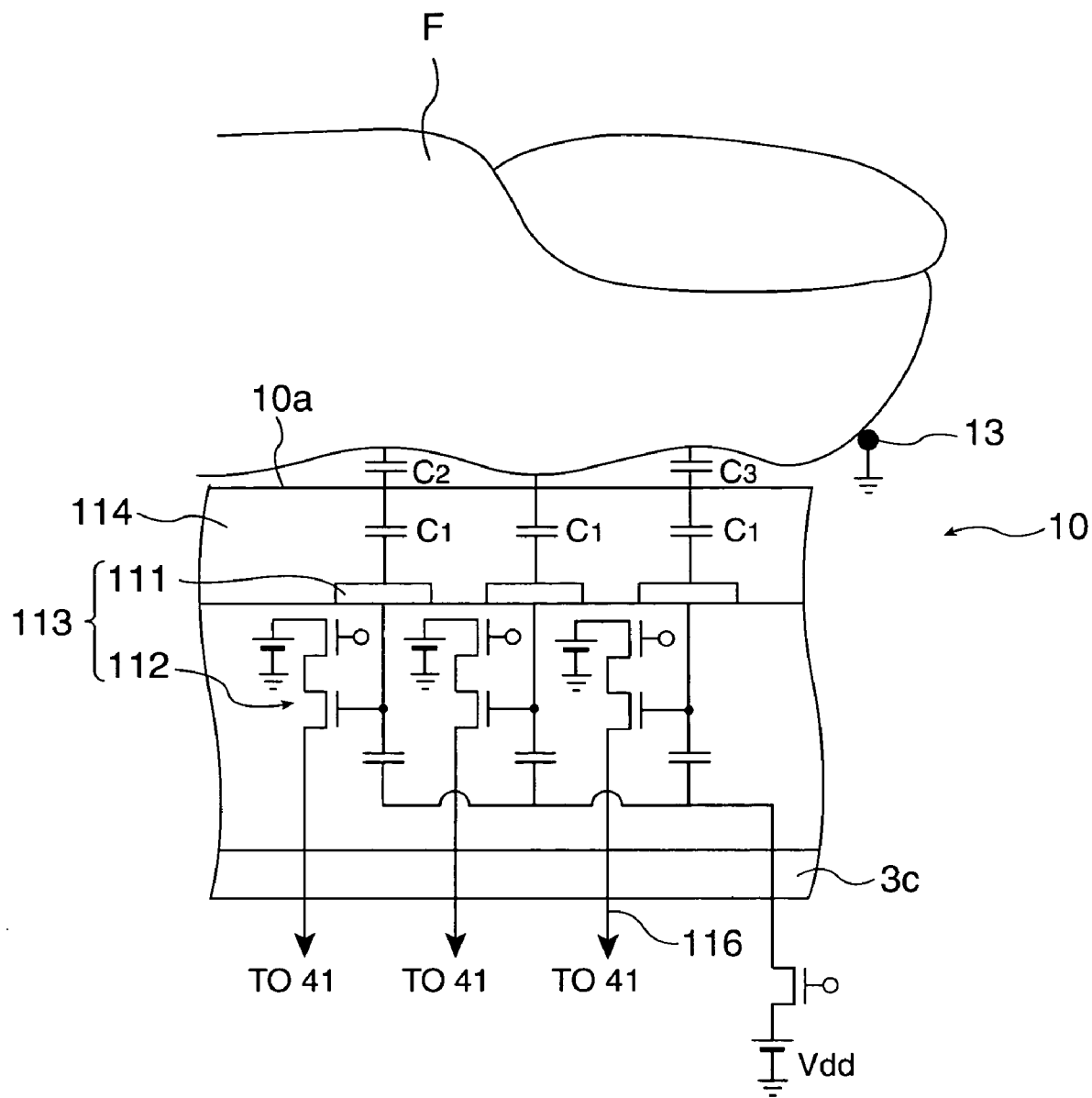
FIG. 4 is a sectional view of a fingerprint sensor matrix part in the identity authentication device according to the first embodiment.

As shown in FIG. 4, the fingerprint sensor matrix part 10 is the capacitance type fingerprint sensor which detects a fingerprint pattern by determining capacitance which varies due to a distance between the fingerprint having concavity and convexity and a detection surface 10a. The fingerprint sensor matrix part 10 is formed on the sensor substrate 3c. A plurality of scan lines and a plurality of signal lines 116 are also provided on the sensor substrate 3c though they are unshown in the figures. Each of the scan lines is formed in parallel and a predetermined space is provided between each two lines. Each of the signal lines 116 is also formed in parallel and with a predetermined space therebetween. Each of the signal lines 116 is provided so as to orthogonally cross the scan lines.

In such fingerprint sensor matrix part 10, a switching element 112 (detection circuit) is provided at each of points corresponding to the intersections of the plurality of the scan lines and the plurality of the signal lines 116.

The active matrix array 113 consists of the scan lines, the signal lines 116 and the switching element 112 which is provided in the plural. On the active matrix array, a sensing electrode 111 is provided at each point corresponding to each switching element 112 and the sensing electrodes are arranged in a matrix.

Each sensing electrode 111 is covered with a dielectric thin film 114 (passivation film) which covers the whole surface of the active matrix array 113. The dielectric thin film 114 is provided so as to be contactable with the finger F of a user of the identity authentication device 1.

A metal-oxide semiconductor (MOS) transistor array formed on a semiconductor substrate, a thin film transistor (TFT) formed on an insulating substrate and the like can be used as the active matrix array 113.

In the fingerprint sensor 10 having the above-mentioned structure, when the finger F touches the detection surface 10a, capacitance (C1, C2, C3 and so on in FIG. 4) distributed in two dimensions is generated between the finger F and each sensing electrode 111 which is provided in matrix. A minute asperity pattern (fingerprint information) formed on the surface of the finger F can be detected by electrically reading each value of the two-dimensional capacitance with the active matrix array 113. In order to prevent a discharge breakdown cased by static electricity with which a human body is charged from occurring, it is necessary to discharge the static electricity charged on the finger F. It is also necessary to make the electric potential of the finger F substantially same with the ground level (reference potential) of the switching element 112 before conducting the detection. Furthermore, in order to stably determine the each value of the capacitance, the electric potential of the finger F is preferably fixed at a predetermined potential at the time of the detection.

Second Embodiment of the Fingerprint Sensor Member

Next, a structure of the fingerprint sensor member 3 according to a second embodiment will be described with reference to FIG. 5.

In this embodiment, different parts from those of the first embodiment will be described. The identical numerals are given to the same structures as those of the above-described first embodiment and those explanations will be omitted.

Figure 5:
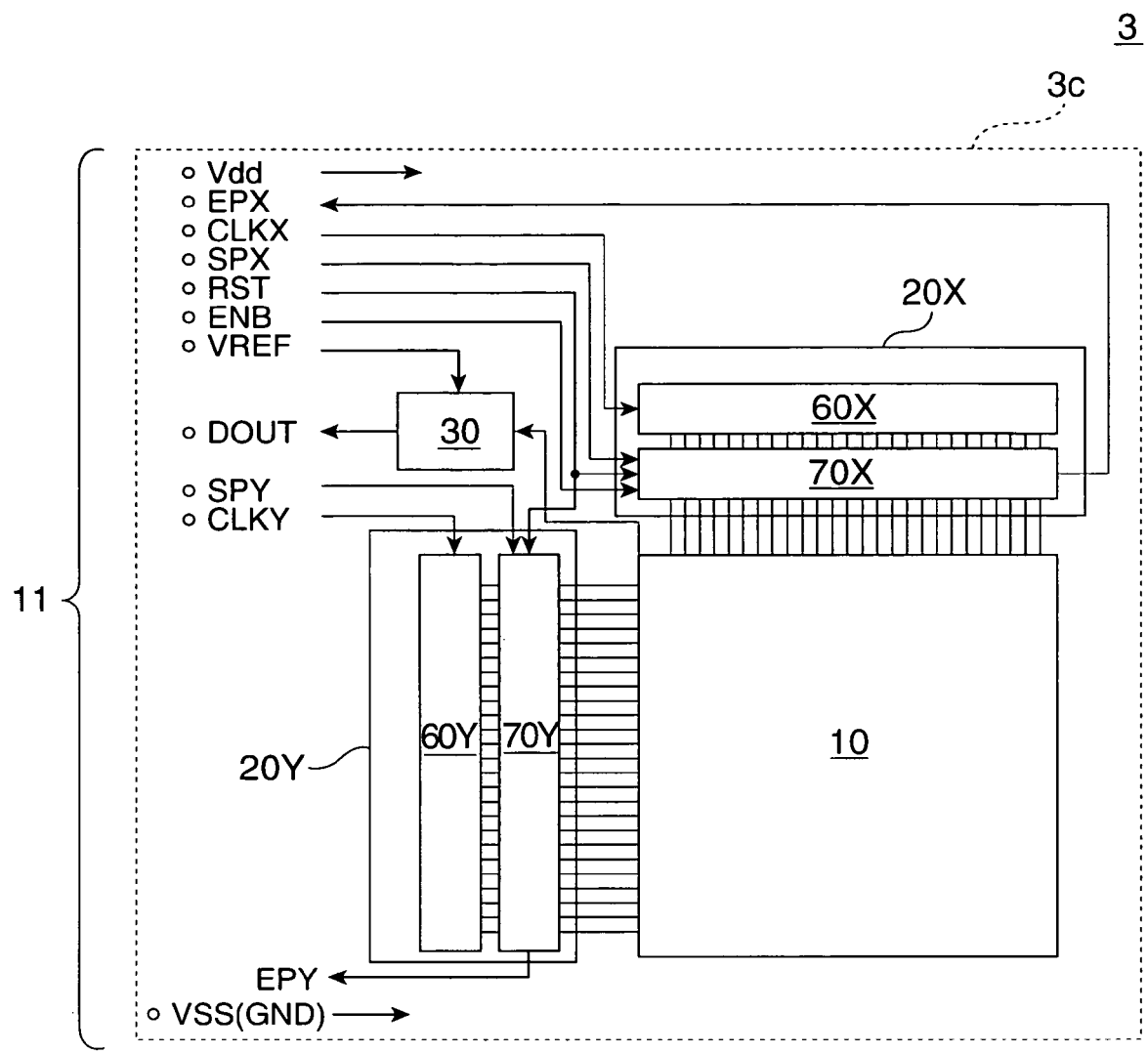
FIG. 5 shows a circuit configuration of the sensor substrate of the identity authentication device according to a second embodiment.

FIG. 5 shows a circuit configuration of the sensor substrate 3c.

Though the fingerprint sensor 3 had the twenty connecting terminals 11 in the above-described first embodiment, a case in which ten of the connecting terminals 11 are provided will be described in this embodiment.

In the fingerprint sensor 3, the fingerprint sensor matrix part 10, the driver circuit parts 20X and 20Y, the amplifier circuit part 30 and a wiring pattern which couples each component are formed on the sensor substrate 3c as shown in FIG. 5. Here, a clock signal circuit 60Y and a shift register circuit 70Y are provided in the driver circuit part 20Y. In the driver circuit part 20X, a clock signal circuit 60X and a shift register circuit 70X are provided. The shift register circuits 70X and 70Y move according to clock signals which are supplied from the clock signal circuits 60X and 60Y in the driver circuit parts 20X and 20Y In the fingerprint sensor 3 according to this embodiment, the connecting terminals 11 provided here are the power supply terminals Vdd and Vss, an input terminal RST (operation instruction), an input terminal CLKX (column side clock), the input terminal SPX (X-Start Pulse), an input terminal CLKY (row side clock), the input terminal SPY (Y-Start Pulse), an input terminal VREF (comparison potential for the amplifier circuit), the input terminal ENB (Enable, extraction instruction) and an output terminal DOUT.

In the sensor substrate 3c having such input/output terminals, the driver circuit parts 20X and 20Y start their operation according to the start pulse. Furthermore, the shift register operates according to the clock signal and transistors in the fingerprint sensor matrix part 10 are sequentially moved by this in order to obtain the fingerprint information. In this way, the driver circuit parts 20X and 20Y can be steadily driven.

Third Embodiment of the Fingerprint Sensor Member

Next, a structure of the fingerprint sensor member 3 according to a third embodiment will be described with reference to FIG. 6.

In this embodiment, different parts from those of the first embodiment and the second embodiment will be described. The identical numerals are given to the same structures as those of the above-described first embodiment and the second embodiment, and those explanations will be omitted.

Figure 6A:
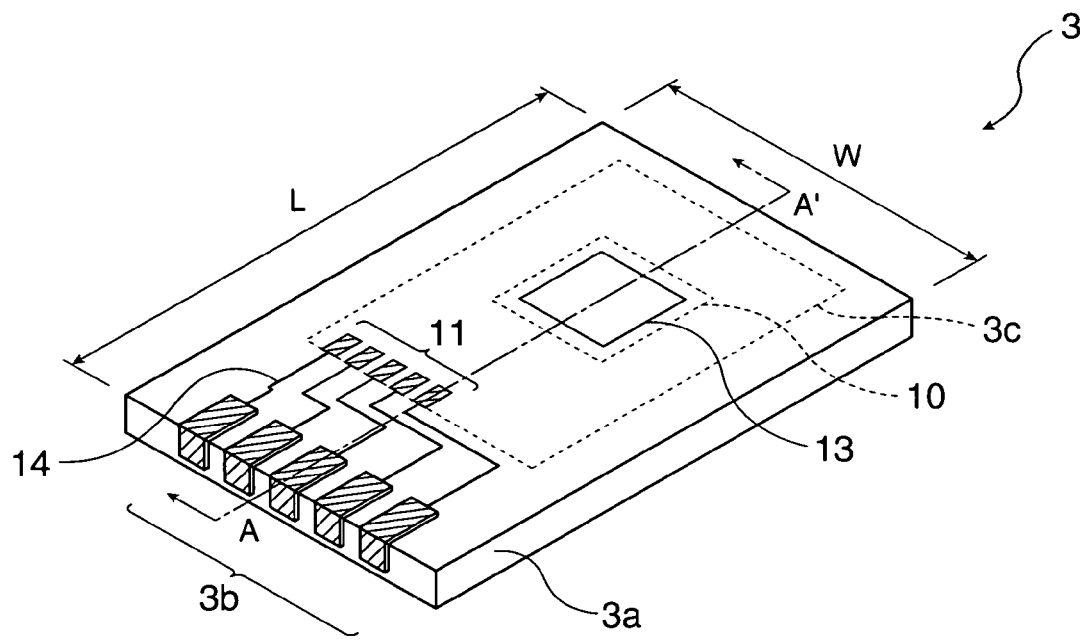
FIGS. 6A and 6B are drawings for explaining a fingerprint sensor member according to a third embodiment.
Figure 6B:
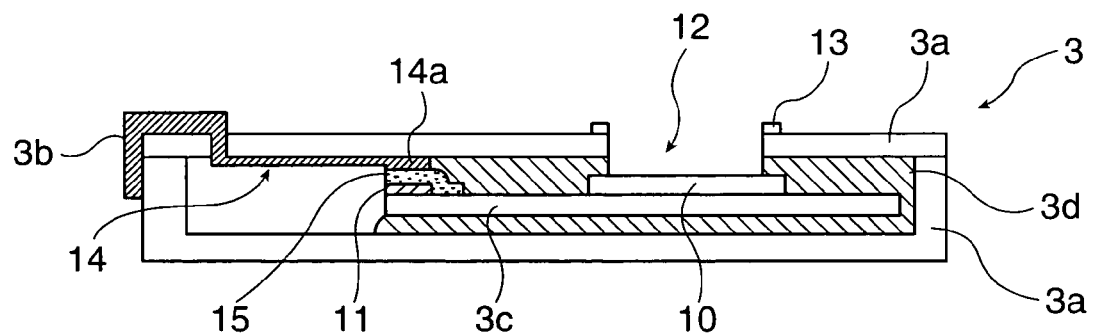
Figure 7A:
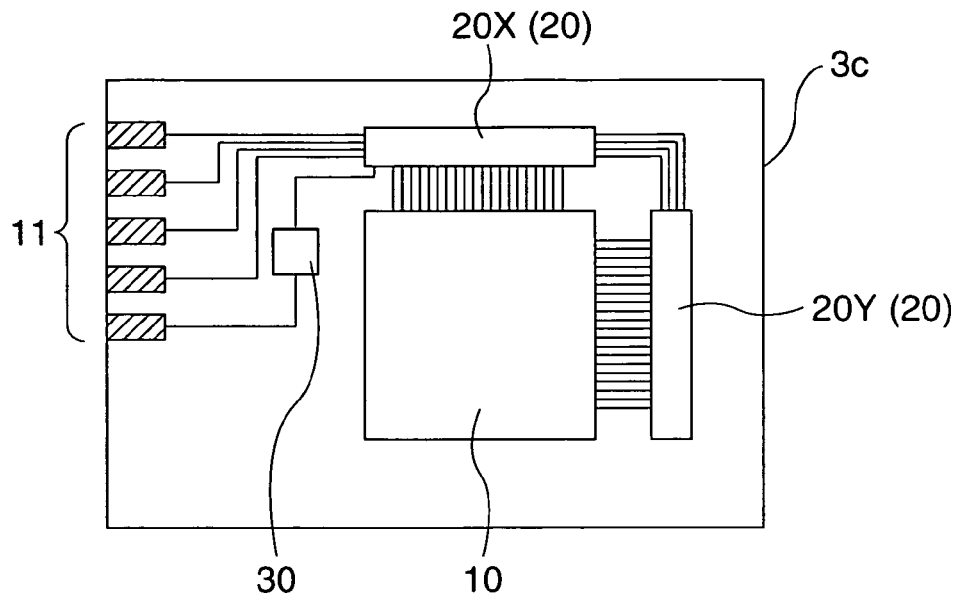
FIGS. 7A and 7B show a circuit configuration of the sensor substrate of the identity authentication device according to the third embodiment.
Figure 7B:
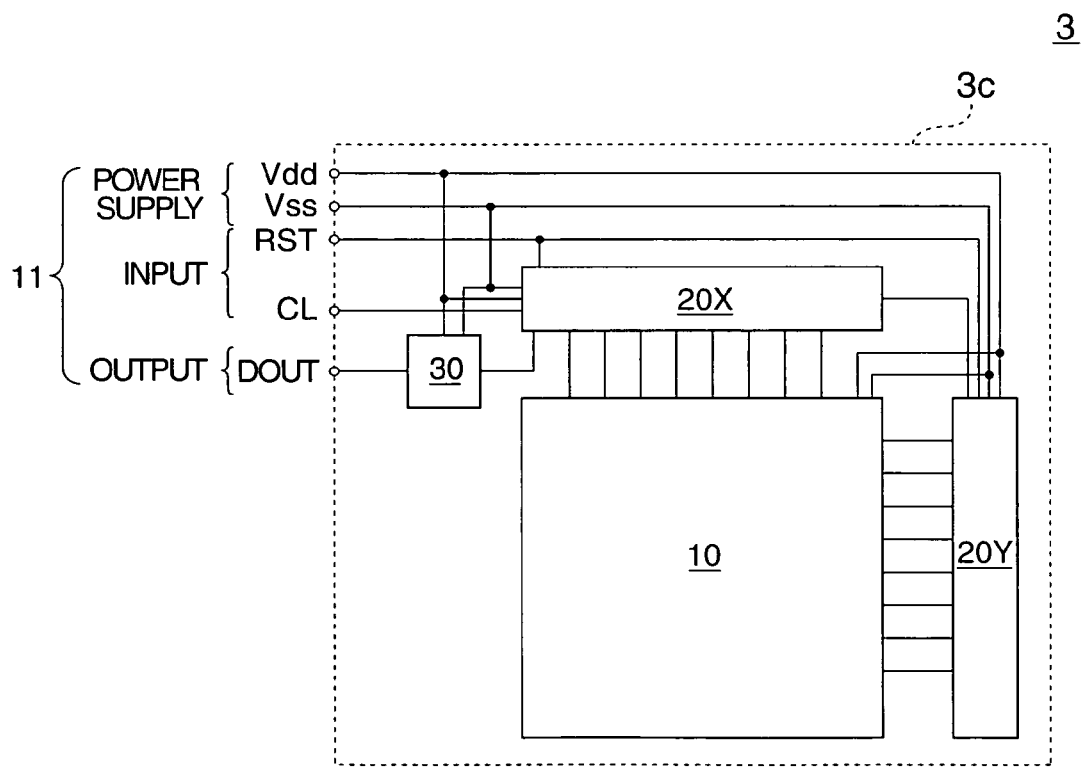

FIGS. 6B and 6B are drawings for explaining the fingerprint sensor member according to the third embodiment. FIG. 6B is an outline view of the fingerprint sensor member and FIG. 6B is a sectional view along the line A-A' in FIG. 6B. FIGS. 7A and 7B show a circuit configuration of the fingerprint sensor member.

The fingerprint sensor member 3 is composed of the main body 3a, the metal terminal 3B, the sensor substrate 3c and the resin member 3d as shown in FIG. 6. The main body 3A forms the outline of the fingerprint sensor member 3. An opening is provided in a part of the main body 3a where corresponds to the fingerprint sensor matrix part 10. Furthermore, a sensor window 12 is formed in the main body 3a.

Furthermore, a metal frame 13 is provided around the sensor window 12 and the metal frame 13 is coupled to the power supply terminal Vss. In this way, the electric potential of the finger F can be fixed to the predetermined potential as shown in FIG. 4. More specifically, it is possible to discharge a static electricity charged on a human body because of the metal frame 13 provided around the sensor window 12. Therefore, the value of the capacitance which varies due to a distance between the fingerprint and the detection surface 10a can be stably determined. Accordingly, it becomes possible to obtain a clear fingerprint image.

Moreover, the sensor window 12 opens inside the fingerprint sensor matrix part 10 and protects the driver circuit which is formed around the fingerprint sensor matrix part 10.

Furthermore, an extraction line 14 is a wiring which is formed on a back side of the main body 3a as shown in FIG. 6B.

The metal terminal 3b is formed on a surface of the fingerprint sensor member 3. The metal terminal 3b is formed so as to protrude from the surface of the fingerprint sensor member 3 so that it can couple with the metal terminal 2b of the case member 2. The connecting terminals 11 formed on the metal terminal 3b and the sensor substrate 3c are electrically conducted each other through the extraction line 14. The extraction line 14 is coupled to the connecting terminals 11 through an anisotropic conductive film 15 (ACF). When the fingerprint sensor member 3 is formed, the ACF 15 is pressed to adhere and deformed. This deformed ACF 15 electrically couples the metal terminal 3b with the connecting terminals 11.

The ACF 15 electrically couples the connecting terminal 11 formed on the sensor substrate 3c with a connecting pad 14a formed on the back side of the main body 3a. The connecting pad 14a is a part where the extraction line 14 is extended and which conducts with the connecting terminal 11 through the ACF 15.

Here, the sensor substrate 3c is the glass substrate. The fingerprint sensor matrix part 10, the connecting terminal 11, a driver circuit part 20 (which will be described below), the amplifier circuit part 30 (which will be described below) and the wiring pattern are formed on the sensor substrate 3c by a commonly used semiconductor manufacturing method such as photolithography. Furthermore, the driver circuit part and the amplifier circuit part 30 are formed around the fingerprint sensor matrix part 10 and the resin member 3d protects these circuit parts.

The resin member 3d is a so-called adhesive. With the resin member 3d, the sensor substrate 3c is fixed to the main body 3a.

Such fingerprint sensor member 3 has a length L of about 15-60 mm and a width W of about 10-60 mm. When the width and the terminal pitch of the connecting terminal 11 are 0.25 mm, the total width of the twenty connecting terminals 11 becomes a length of 10 mm and this makes it easy to couple the connecting terminals with the connecting pad 14a Next, a circuit configuration on the sensor substrate 3c will be described with reference to FIGS. 7A and 7B.

In this embodiment, the fingerprint sensor matrix part 10, the driver circuit parts 20Y and 20X, the amplifier circuit part 30 and the wiring pattern which couples each component are formed on the sensor substrate 3c as shown in FIG. 7A. Here, the driver circuit parts 20X and 20Y are the column circuit 20X and the row circuit 20Y. The above-mentioned active matrix array 113 is coupled to the column circuit 20X and the row circuit 20Y, and the plurality of scan lines or the plurality of signal lines 116 in the fingerprint sensor matrix part 10 is coupled to the either the column circuit 20X or the row circuit 20Y The column circuit 20X and the row circuit 20Y drive the active matrix array 113 and receive the fingerprint information of the finger F as an electric signal.

The connecting terminals 11 provided here are the power supply terminals Vdd and Vss, the input terminal RST (operation instruction), an input terminal CL (clock) and the output terminal DOUT as shown in FIG. 7B. Each terminal is electrically coupled with the metal terminal 3b which is coupled to the extraction line 14 through the ACF 15 as shown in FIG. 2. Though the five terminals are provided on the sensor substrate 3c in this embodiment, the number of the terminals can be changed according to the structure of the sensor member 3.

The connecting terminals 11 are coupled to the connecting pad 14a through the ACF 15 as shown in FIG. 6B so that the connecting terminals 11 are electrically coupled to the metal terminal 3b. When the fingerprint sensor member 3 is fitted in the concave portion 2a of the case member 2, the metal terminal 2B contacts with the mental terminal 3b and the signals from the case member 2 can be transmitted through the connecting terminals 11.

Next, various configuration examples of the connecting terminals 11 will be described with reference to FIG. 8.

FIG. 8 is a drawing for explaining the various configuration examples of the connecting terminals.

As shown in FIG. 8, CASE 1 though CASE 5 which are configuration examples for the connecting terminals 11 may be adopted. CASE 1 is a case of the above-described first embodiment in which the twenty connecting terminals 11 are provided.

CASE 2 is a case of the above-described second embodiment in which the ten connecting terminals 11 are provided.

CASE 3 is a case in which seven connecting terminals 11 are provided. In this case, the seven connecting terminals 11 are the power supply terminals Vdd and Vss, the output terminal D-OUT, an input terminal Reset (operation instruction), an input terminal Clock (column side clock), the input terminal VREF (comparison potential for the amplifier circuit) and the input terminal ENB (Enable, extraction instruction).

CASE 4 is a case of the above-described third embodiment in which the five connecting terminals 11 are provided.

CASE 5 is a case in which four connecting terminals 11 are provided. In this case, the four connecting terminals 11 are the power supply terminals Vdd and Vss, the output terminal D-OUT and the input terminal Reset (operation instruction).

As shown in CASE 1 though CASE 5, it is possible to reduce the number of the terminals in the sensor substrate 3c.

As described above, the fingerprint sensor member 3 of the identity authentication device 1 is detachable from the case member 2 so that only the fingerprint sensor member 3 can be easily replaced when the dielectric thin film 114 of the fingerprint sensor member 3 is broken away or damaged by friction or degradation. In other words, even when the fingerprint sensor member 3 is broken away or damaged, the case member 2 still can be used and only the fingerprint sensor member 3 where the damage is caused can be changed.

Moreover, the metal terminals 3b and 2b are provided in the fingerprint sensor member 3 and the case member 2 so that the fingerprint sensor member 3 and the case member 2 are electrically coupled each other through the metal terminals 3b and 2b. Therefore, when the fingerprint sensor member 3 is fitted in the case member 2, the fingerprint information obtained by the fingerprint sensor member 3 can be electrically transmitted to the case member 2.

Furthermore, the fingerprint sensor member 3 has the fingerprint sensor matrix part 10 which detects the fingerprint information as the capacitance, the driver circuit parts 20X and 20Y which obtain the fingerprint information and the amplifier circuit part 30 which amplifies the voltage signal of the fingerprint information. Therefore, the fingerprint sensor matrix part 10 can detect the fingerprint information as the capacitance, the driver circuit parts 20X and 20Y can obtain the fingerprint information and the amplifier circuit part 30 can amplify the voltage signal of the fingerprint information.

Moreover, it is not necessary to form these circuit parts in the case member 2 since these circuit parts can be provided in the fingerprint sensor member 3. For example, when the driver circuit parts 20X and 20Y and the amplifier circuit part 30 are not provided in the fingerprint sensor member, about 500 output terminals each in the row side and the column side so that about 1000 output terminals in total have to be provided in the fingerprint sensor member. However, it is not necessary to have such a large number of terminals because the driver circuit parts 20X and 20Y and the amplifier circuit part 30 are provided in the fingerprint sensor member. If about a thousand of the metal terminals 3b are provided in the fingerprint sensor member 3, about a thousand of the metal terminals 2b have to be provided in the case member 2. In this case, a pitch between each two metal terminals becomes very small and a contact area per metal terminal becomes smaller so that reliability of the electrical connection will be degraded.

Instead, the fingerprint sensor member 3 has the fingerprint sensor matrix part 10, the driver circuit parts 20X and 20Y and the amplifier circuit part 30 in the above-described embodiments so that the number of the metal terminals which are coupled to the metal terminals 2b of the case member 2 can be largely reduced. Therefore, it is possible to provide these circuits in the fingerprint sensor member 3 itself and the reliability of the electrical connection with the metal terminals 2b of the case member 2 can be secured. In addition, the number of the metal terminals 2b and 3b is largely reduced compared to the case when the large number of the metal terminals is provided as described the above. Therefore, the areas of the metal terminals 2a and 3a can be expanded. Accordingly, the electric connection between the metal terminal 3b of the fingerprint sensor member 3 and the metal terminal 2b of the case member 2 can be assured and the electric connection can be easily realized.

Furthermore, when the above-mentioned driver circuit parts 20X and 20Y and the amplifier circuit part 30 are provided in the case member 2, a voltage drop in the signal voltage could occur because of the wiring resistance of the metal wiring between the case member 2 and the fingerprint sensor member 3. As a result, sensitivity of the fingerprint information signal which is inputted to the driver circuit parts 20X and 20Y could be deteriorated. However, the driver circuit parts 20X and 20Y and the amplifier circuit part 30 are provided in the fingerprint sensor member 3 in the above-described embodiments so that the signal voltage inputted from the driver circuit parts 20X and 20Y is amplified by the amplifier circuit part 30 in the fingerprint sensor member 3. Therefore, the voltage drop cased by the wiring resistance can be prevented and highly sensitive fingerprint information can be transmitted to the case member 2.

Moreover, the processing part 2c including the power supply, the CPU, the memory and the I/F are provided in the case member 2 in the above-mentioned embodiments. Therefore, it is not necessary to provide these components in the fingerprint sensor member 3. If the processing part 2c is provided in the fingerprint sensor member 3, for example, the structure of the fingerprint sensor member 3 will become more complicated and more manufacturing processes are required to form the fingerprint sensor member 3. Accordingly, a manufacturing cost per finger print sensor will rise. On the contrary, according to the above-described embodiments, the fingerprint sensor member 3 can be inexpensively manufactured because the processing part 2c is provided in the case member 2 rather than the fingerprint sensor member 3. Furthermore, when the fingerprint sensor member 3 is damaged and replaced by the new one, it is possible to make its replacement cost minimum.

Moreover, the concave portion 2a is formed in the case member 2 and the fingerprint sensor member 3 is fitted in the concave portion 2a. Therefore, it is possible to conduct alignment between the case member 2 and the fingerprint sensor member 3 and a precise positioning is possible. In addition, the metal terminal 2b of the case member 2 is coupled to the metal terminal 3b of the fingerprint sensor member 3 without any displacement so that its electric connection can be assuredly obtained.

Furthermore, the fingerprint sensor member 3 is detachable from the case member 2 of the identity authentication device 1 as described above. This means that only the fingerprint sensor member 3 can be easily replaced when the fingerprint sensor member 3 is damaged or broken away because the fingerprint sensor member 3 is made to be detachable from the case member 2. In other words, the case member 2 still can be used and only the fingerprint sensor member 3 where the damage is caused can be changed. In addition, the fingerprint sensor member 3 can be inexpensively manufactured so that the fingerprint sensor member 3 can be widely disseminated.

Although the embodiments of the invention have been fully described by way of example with reference to the accompanying drawings, it is to be understood that the embodiments described hereunder do not in any way limit the scope of the invention but various changes and modifications will be applied within the scope and spirit of the present invention.

What is claimed is:

1. An identity authentication device, comprising:
    a case;
    a fingerprint sensor unit attachable to and detachable from the case, the fingerprint sensor unit including:
        a main body that includes a window; and
        a sensor substrate that includes a detection matrix and a driver circuit for driving the detection matrix, the detection matrix exposed through the window and the driver circuit enclosed and covered by the main body;
    a first metal terminal disposed on the fingerprint sensor; and
    a second metal terminal disposed on the case at a position so as to abut against the first metal terminal and electrically connect to the first metal terminal while the fingerprint sensor unit is coupled to the case.

2. The identity authentication device according to claim 1, wherein the detection matrix detects fingerprint information as capacitance, the fingerprint sensor unit further including an amplifier circuit part amplifying a voltage signal of the fingerprint information.

3. The identity authentication device according to claim 1, wherein the case has a concave portion in which the fingerprint sensor unit is fitted.

4. The identity authentication device according to claim 1, further comprising a resin member located between the driver circuit and the main body.

5. A sensor unit for identity authentication, the sensor unit being attachable with and detachable from a case member, the case member having a processing part that processes data from the sensor unit, the sensor unit comprising:
    a main body that includes a window;
    a detection part that detects a capacitance between the detection part and an object to be detected, the detection part having a detection matrix and a driver circuit for driving the detection matrix, the detection matrix exposed through the window and the driver circuit enclosed and covered by the main body; and
    a terminal being electrically connected to the detection part, the terminal electrically connecting the detection part to the processing part when the sensor unit is attached to the case member, the detection part electrically disconnected from the processing part when the sensor unit is detached from the case member.

6. The sensor unit according to claim 5, wherein the detection part detects the capacitance stored between the detection part and a fingerprint.

7. The sensor unit according to claim 6, wherein the detection part further includes an amplifier circuit part amplifying a voltage signal of the fingerprint.

8. The sensor unit of claim 5, further comprising a resin member located between the driver circuit and the housing.

9. The sensor unit of claim 5, further comprising a metal frame adjacent the window, the metal frame discharging static electricity from the object.

10. The sensor unit of claim 5, further comprising a deformable member that deforms to selectively couple the detection part electrically with the terminal.

11. A sensor device comprising:
    a fingerprint sensor unit that includes a main body and a sensor substrate with a detection matrix and a driver circuit for driving the detection matrix, at least one of the sensor substrate, the detection matrix, and the driver circuit being enclosed and covered by the main body, the fingerprint sensor unit further including a first terminal exposed from the main body, the first terminal electrically connected to the detection matrix, wherein the main body further includes a window, and wherein the detection matrix is exposed through the window; and
    a case member including a processing part, a recess that attachably and detachably receives the fingerprint sensor unit, and a second terminal disposed within the recess, the second terminal electrically connected to the processing part, the first terminal abutting the second terminal and electrically connecting to the second terminal when the fingerprint sensor unit is received within the recess, the processing part processing fingerprint information sent from the fingerprint sensor unit via the first and second terminals.

12. The sensor device of claim 11, wherein the detection matrix detects the fingerprint information as capacitance, the fingerprint sensor unit further including an amplifier circuit part amplifying a voltage signal of the fingerprint information.

13. The sensor device of claim 11, further comprising a resin member located between the driver circuit and the main body.

14. The sensor device of claim 11, further comprising a metal frame adjacent the window, the metal frame discharging static electricity from a fingerprint.

15. The sensor device of claim 11, further comprising a deformable member that deforms to selectively couple the detection matrix electrically with the first terminal.

* * * * *